(12) United States Patent
Villalobos

(10) Patent No.: US 10,975,558 B1
(45) Date of Patent: Apr. 13, 2021

(54) TOILET SEALING RING AND BOOT

(71) Applicant: Nelson Villalobos, Deerfield Beach, FL (US)

(72) Inventor: Nelson Villalobos, Deerfield Beach, FL (US)

(*) Notice: Subject to any disclaimer, the term of this patent is extended or adjusted under 35 U.S.C. 154(b) by 0 days.

(21) Appl. No.: 16/740,665

(22) Filed: Jan. 13, 2020

(51) Int. Cl.
| | | |
|---|---|---|
| *E03D 11/16* | (2006.01) | |
| *E03D 11/10* | (2006.01) | |
| *F16L 5/10* | (2006.01) | |
| *E03D 11/17* | (2006.01) | |
| *E03D 11/13* | (2006.01) | |

(52) U.S. Cl.
CPC .............. *E03D 11/16* (2013.01); *E03D 11/10* (2013.01); *E03D 11/135* (2013.01); *E03D 11/17* (2013.01); *F16L 5/10* (2013.01)

(58) Field of Classification Search
CPC ....... E03D 11/16; E03D 11/10; E03D 11/135; E03D 11/17; F16L 5/10
USPC .................................. 4/252.5, 252.6, 245.1
See application file for complete search history.

(56) References Cited

U.S. PATENT DOCUMENTS

| | | | | |
|---|---|---|---|---|
| 3,349,412 A | * | 10/1967 | Schwartz ................. | E03D 11/16 4/252.6 |
| 8,955,172 B2 | | 2/2015 | Culwell | |
| 2001/0023505 A1 | * | 9/2001 | Atkins ..................... | E03D 11/16 4/252.6 |
| 2002/0023294 A1 | * | 2/2002 | Spells, Sr. ............... | E03D 11/16 4/252.6 |
| 2003/0009820 A1 | * | 1/2003 | Telles ...................... | E03D 11/16 4/252.6 |
| 2003/0033662 A1 | * | 2/2003 | Spells, Sr. ............... | E03D 11/17 4/252.5 |
| 2004/0128752 A1 | * | 7/2004 | Atkins ..................... | E03D 11/17 4/252.6 |
| 2005/0035558 A1 | * | 2/2005 | Dipzinski ............... | F16L 23/16 277/628 |
| 2005/0108814 A1 | * | 5/2005 | Thompson .............. | E03D 11/16 4/252.6 |
| 2005/0283889 A1 | * | 12/2005 | Flushing ................. | E03D 11/16 4/252.1 |
| 2007/0256220 A1 | * | 11/2007 | Lee ......................... | E03D 11/16 4/252.1 |
| 2011/0185487 A1 | * | 8/2011 | Miller ..................... | E03D 11/16 4/252.5 |
| 2015/0135421 A1 | * | 5/2015 | Guthrie ................... | E03D 11/16 4/252.6 |
| 2015/0376887 A1 | * | 12/2015 | Coronado ............... | E03D 11/16 29/890.141 |

(Continued)

*Primary Examiner* — Benjamin R Shaw
(74) *Attorney, Agent, or Firm* — Sanchelima & Associates, P.A.; Christian Sanchelima; Alexander Rodriguez

(57) ABSTRACT

A toilet sealing ring and boot is disclosed herein. The toilet sealing ring and boot includes a toilet flange adapter comprising a rubber flange ring, seal, or gasket and a rubber boot or sleeve for connecting the toilet to the sewer system pipes. The toilet sealing ring and boot is configured to replace the existing wax ring on traditional toilets. The existing wax ring on existing toilets break down easily and do not provide optimal protection against leaks. Furthermore, the toilet sealing ring includes a boot assembly with a ring assembly mounted to its top end. The ring assembly may be made out of rubber and includes a memory foam material. The memory foam material aids the toilet sealing ring and boot to be mounted onto any toilet.

10 Claims, 3 Drawing Sheets

(56) References Cited

U.S. PATENT DOCUMENTS

| 2019/0040616 | A1* | 2/2019 | Coronado | E03D 11/16 |
| 2019/0085548 | A1* | 3/2019 | Guthrie | E03D 11/17 |
| 2019/0234057 | A1* | 8/2019 | Couture | E03D 11/17 |
| 2019/0316338 | A1* | 10/2019 | Pytlewski | E03D 11/17 |

* cited by examiner

TOILET SEALING RING AND BOOT

BACKGROUND OF THE INVENTION

1. Field of the Invention

The present invention relates to a wax ring replacement for a toilet and, more particularly, to a toilet sealing ring and boot that replaces the wax ring of a toilet.

2. Description of the Related Art

Several designs for a toilet sealing ring and boot have been designed in the past. None of them, however, include a toilet flange adapter comprising a rubber flange ring, seal, or gasket and a rubber boot or sleeve for connecting the toilet to the sewer system pipes. It is known that currently existing toilets often use a wax ring to secure the toilet to existing sewer system pipes. It is also known that these wax rings are easily broken and do not last a substantial amount of time to provide leakage protection to a toilet in regular use. Additionally, wax rings only have a one-time use that allows a user to fit the wax ring to a toilet. The wax ring must be continually replaced in order to provide optimal leakage protection to an existing toilet. Therefore, there is a need for a toilet sealing ring and boot to replace the wax ring found on existing toilets. The toilet sealing ring and boot provides a user with an efficient and long lasting method of mounting a toilet to existing sewer system pipes.

Applicant believes that a related reference corresponds to U.S. patent (published application) No. 2019/0085548 issued for a modular waxless seal for sealing a connection between a bottom of a toilet and a floor flange. Applicant believes another related reference corresponds to U.S. Pat. No. 8,955,172 issued for a cylindrical toilet seal made of rubber coated with a sealant. However, these references differ from the present invention because they fail to disclose a toilet flange adapter comprising a rubber flange ring, seal, or gasket and a rubber boot or sleeve for connecting the toilet to the sewer system pipes. The present invention addresses these issues by providing a rubber boot with an integral ring to replace existing wax rings on toilets.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a toilet sealing ring and boot that is designed to replace the existing wax ring on a toilet. Additionally, the toiler sealing ring and boot is re-usable and can be configured to fit any toilet.

It is another object of this invention to provide a toilet sealing ring and boot that will last for a substantially longer amount of time than a wax ring to more efficiently stop and prevent leak damage from a toilet.

It is still another object of the present invention to provide a toilet sealing ring and boot that includes a boot that is configured to fit inside an existing drain tubing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
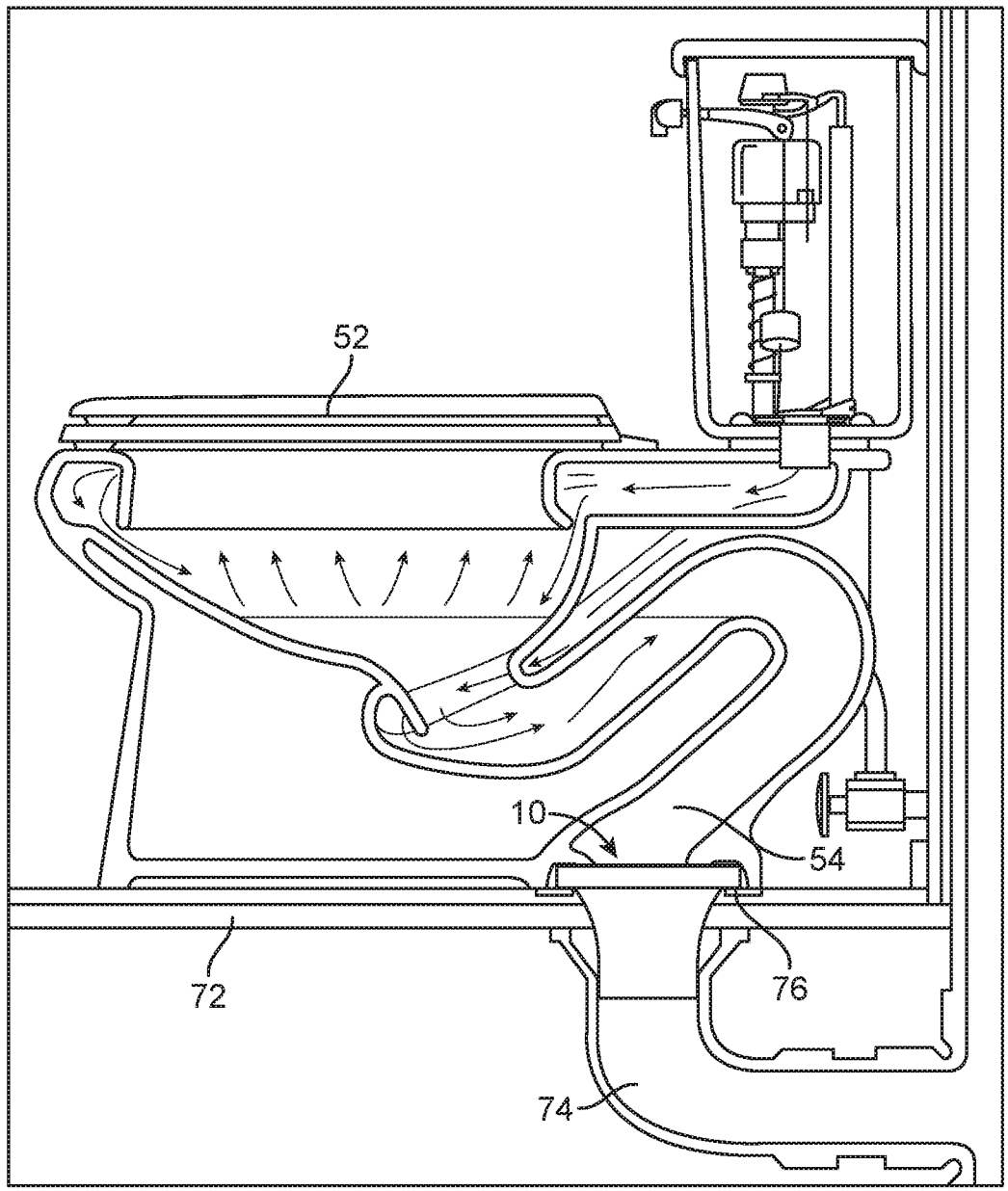
FIG. 1 represents a view of a toilet sealing ring and boot 10 in its operating environment in accordance to an embodiment of the present invention.
Figure 2:
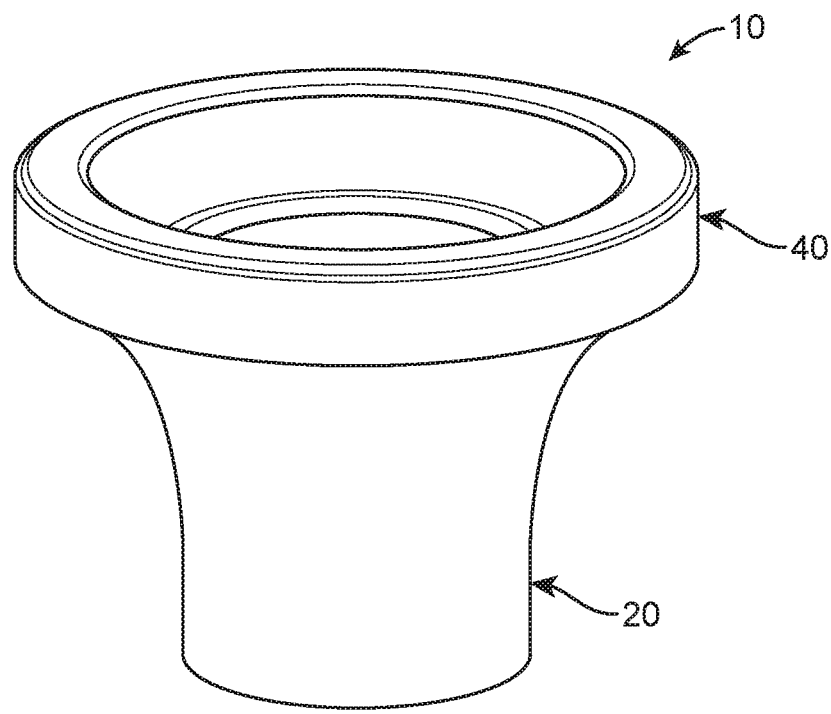
FIG. 2 shows an isometric view of toilet sealing ring and boot 10 in accordance to an embodiment of the present invention.
Figure 3:
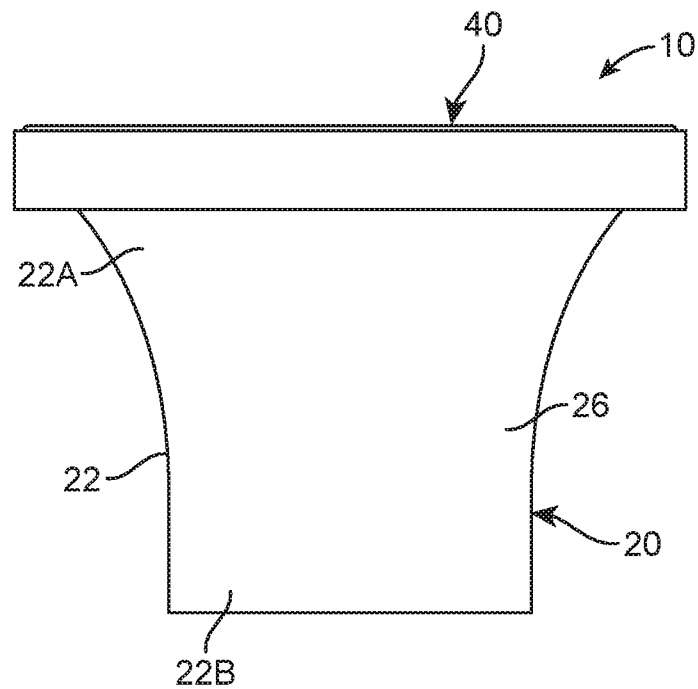
FIG. 3 illustrates a side view of toilet sealing ring and boot 10 wherein boot assembly 20 may be observed in accordance to an embodiment of the present invention.
Figure 4:
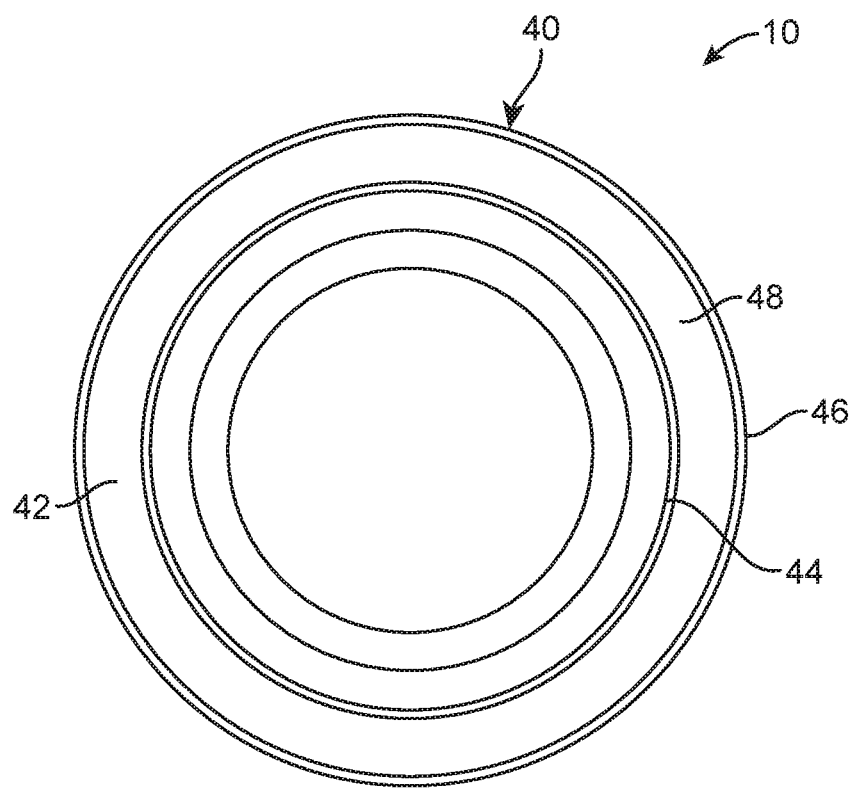
FIG. 4 is a representation of a top view of a ring assembly 40 in accordance to an embodiment of the present invention.
Figure 5:
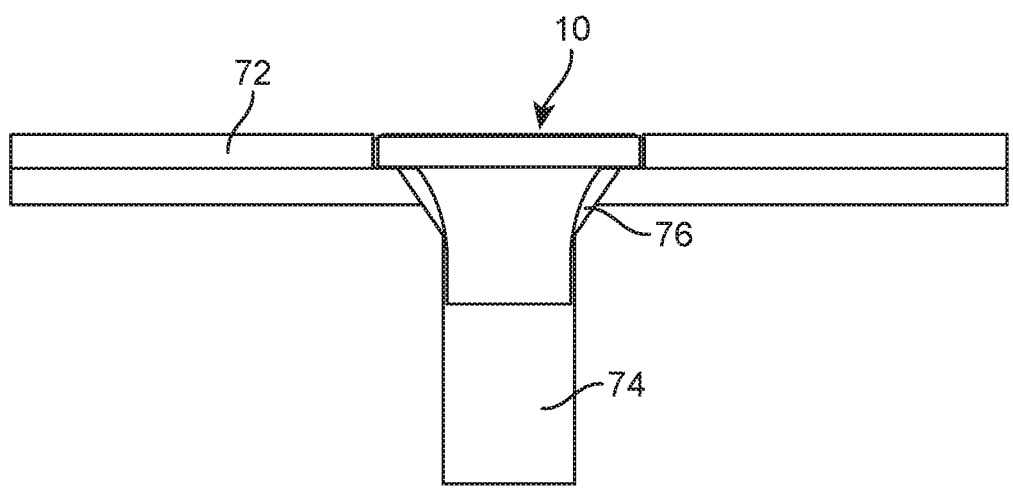
FIG. 5 shows a side view of toilet sealing ring and boot 10 mounted within a sewer system pipe 74 in accordance to an embodiment of the present invention.

Referring now to the drawings, where the present invention is generally referred to with numeral 10, it can be observed a toilet sealing ring and boot 10 that basically includes a boot assembly 20, a ring assembly 40, a toilet 52, and a ground surface 72.

Boot assembly 20 includes a body 22 having a top end 22A and a bottom end 22B. In one embodiment, body 22 may be in the shape of a truncated cone. In this embodiment, top end 22A has a larger diameter than that of bottom end 22B. Furthermore, body 22 tapers inwardly from top end 22A to bottom end 22B. Additionally, body 22 is hollow therein to allow fluid and waste to comfortably pass therethrough. Body 22 further includes a thickness extending from an outer surface area 26 to a predetermined amount within a hollow portion of body 22. In one embodiment, body 22 may be made of a rubber material. The rubber material provides the necessary support for body 22 such that it may be reusable and withstand a suitable amount of pressure. In one embodiment, outer surface area 26 may be of a smooth variety having no protrusions thereon. Furthermore, boot assembly 20 is mounted to a ground surface 72 having a sewer system pipe 74. Sewer system pipe 74 further having a flange 76 mounted thereon. Boot assembly 20 fits securely within sewer system pipe 72. In one embodiment, body 22 extends a predetermined amount within sewer system pipe 74. Additionally, outer surface area 26 of body 22 may remain flush with an inner portion of sewer system pipe 74.

Ring assembly 40 includes a flange ring 42 mounted to top end 22A of body 22. In one embodiment, flange ring 42 may be removably mounted to body 22. In another embodiment, flange ring 42 may be provided as an integral part of body 22. Flange ring 42 includes an inner diameter 44 that cooperates with the diameter of top end 22A of body 22. Additionally, flange ring 42 includes an outer diameter 46 extending a predetermined amount from top end 22A of body 22. In a preferred embodiment, flange ring 22 may be made of a memory foam material. This memory foam material may include viscoelastic polyurethane foam or low resilience polyurethane foam. The foam material allows flange ring 42 to adhere to the shape of the object it is being mounted to. Additionally, flange ring 42 includes an upper surface area 48 having an adhesive material thereon. The adhesive material provides further support to mount flange ring 42 to an object. In one embodiment, flange ring 22 is mounted to an outlet 54 located on a bottom end of toilet 52. The adhesive material aids flange ring 54 in being securely mounted to the bottom end of toilet 52. Furthermore, flange ring 42 envelops the area surrounding outlet 54. The memory material of flange ring 42 allow it to adapt to the shape and size necessary to create a secure seal for toilet 52. Additionally, this allows flange ring 42 to be adapted to any existing toilet regardless of shape or size. Toilet sealing ring and boot 10 allows a user to effectively seal toilet 52 to a sewer system pipe 74. Additionally, toilet sealing ring and boot 10 is reusable and can be mounted to any existing toilet. As a result, a user saves money from constantly having to buy and mold new wax rings when repairing or installing a new toilet.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a toilet sealing ring and boot, comprising:
   a. a toilet having an outlet mounted to a bottom end of said toilet;
   b. a ground surface having a flange attached to a sewer system pipe;
   c. a boot assembly, including a body having a top end and a bottom end, said body having the shape of a truncated cone, wherein said body tapers inwardly from said top end to said bottom end, said top end having a greater diameter than said bottom end, wherein said boot is made of a rubber material, said body being hollow therein, said body having an outer surface area being a smooth surface, wherein said boot assembly is mounted within said sewer system pipe; and
   d. a ring assembly, including a flange ring mounted to said top end of said body, wherein an inner diameter of said flange ring cooperates with the diameter of said top end of said body, wherein said flange ring has an outer diameter extending a predetermined amount from said top end of said body, wherein said ring is made of a memory foam material, said ring having an upper surface area including an adhesive material thereon, wherein said flange ring receives said outlet of said toilet, wherein said memory foam material adheres to the shape of said outlet of said toilet to securely seal said flange ring thereon.

2. The system for a toilet sealing ring and boot of claim 1 wherein said memory foam of said flange ring adheres to the shape of said flange.

3. The system for a toilet sealing ring and boot of claim 1 wherein said ring assembly is integrally mounted to said boot assembly.

4. The system for a toilet sealing ring and boot of claim 1 wherein said body of said boot assembly extends a predetermined amount within said sewer system pipe.

5. The system for a toilet sealing ring and boot of claim 1 wherein said boot assembly and said ring assembly are reusable.

6. The system for a toilet sealing ring and boot of claim 1 wherein said outer surface area of area of said body remains flush with an inner portion of said sewer system pipe.

7. The system for a toilet sealing ring and boot of claim 1 wherein said flange ring creates a secure seal surrounding said outlet of said toilet.

8. The system for a toilet sealing ring and boot of claim 1 wherein said adhesive material is a viscoelastic polyurethane foam.

9. The system for a toilet sealing ring and boot of claim 1 wherein said flange ring entirely covers a surrounding perimeter of said outlet.

10. A system for a toilet sealing ring and boot, comprising:
   a. a toilet having an outlet mounted to a bottom end of said toilet;
   b. a ground surface having a flange attached to a sewer system pipe;
   c. a boot assembly, including a body having a top end and a bottom end, said body having the shape of a truncated cone, wherein said body tapers inwardly from said top end to said bottom end, said top end having a greater diameter than said bottom end, wherein said boot is made of a rubber material, said body being hollow therein, said body having an outer surface area being a smooth surface, wherein said boot assembly is mounted within said sewer system pipe, wherein said body of said boot assembly extends a predetermined amount within said sewer system pipe, wherein said outer surface area of area of said body remains flush with an inner portion of said sewer system pipe;
   d. a ring assembly, including a flange ring mounted to said top end of said body, wherein an inner diameter of said flange ring cooperates with the diameter of said top end of said body, wherein said flange ring has an outer diameter extending a predetermined amount from said top end of said body, wherein said ring is made of a memory foam material, said ring having an upper surface area including an adhesive material thereon, wherein said adhesive material is a viscoelastic polyurethane foam, wherein said flange ring receives said outlet of said toilet, wherein said memory foam material adheres to the shape of said outlet of said toilet to securely seal said flange ring thereon, wherein said flange ring adheres to the shape of said flange, wherein said ring assembly is integrally mounted to said boot assembly.

* * * * *